(12) United States Patent
Davis et al.

(10) Patent No.: US 11,958,153 B2
(45) Date of Patent: Apr. 16, 2024

(54) METHOD FOR OPERATING A MACHINE TOOL, AND MACHINE TOOL

(71) Applicant: MAG IAS GmbH, Eislingen (DE)

(72) Inventors: Ralph Davis, Eislingen (DE); Horst Fondy, Göppingen (DE); Jürgen Menze, Gingen an der Fils (DE)

(73) Assignee: MAG IAS GMBH, Eislingen (DE)

( * ) Notice: Subject to any disclaimer, the term of this patent is extended or adjusted under 35 U.S.C. 154(b) by 980 days.

(21) Appl. No.: 16/620,104

(22) PCT Filed: Jun. 6, 2018

(86) PCT No.: PCT/EP2018/064841
§ 371 (c)(1),
(2) Date: Dec. 6, 2019

(87) PCT Pub. No.: WO2018/224526
PCT Pub. Date: Dec. 13, 2018

(65) Prior Publication Data
US 2020/0206858 A1    Jul. 2, 2020

(30) Foreign Application Priority Data

Jun. 9, 2017 (DE) ..................... 10 2017 209 822.8

(51) Int. Cl.
*B23Q 11/10* (2006.01)
*B23Q 11/12* (2006.01)
*G05B 19/04* (2006.01)

(52) U.S. Cl.
CPC ...... *B23Q 11/1015* (2013.01); *B23Q 11/1046* (2013.01); *B23B 2250/12* (2013.01);
(Continued)

(58) Field of Classification Search
CPC ............ B23Q 11/1015; B23Q 11/1038; B23Q 11/1046; B23Q 11/127; B23B 2250/12; G05B 19/0405; G05B 2219/49043
See application file for complete search history.

(56) References Cited

U.S. PATENT DOCUMENTS

2012/0245742 A1* 9/2012 Clausmann ............ B23Q 17/00
700/282
2014/0262197 A1* 9/2014 Wenderott ......... B23Q 11/1038
165/281
(Continued)

FOREIGN PATENT DOCUMENTS

DE    102 38 203 A1    3/2004
DE    102 48 932 A1    4/2004
(Continued)

*Primary Examiner* — Michael R Mansen
*Assistant Examiner* — Mark K Buse
(74) *Attorney, Agent, or Firm* — McGlew and Tuttle, P.C.

(57) ABSTRACT

In a method for operating a machine tool, a machine-specific flow resistance and a respective tool-specific flow resistance are ascertained for various tools. Tool-specific regulator parameters for regulating a pump of a coolant lubricant device are computed on the basis of the machine-specific flow resistance and the tool-specific flow resistance of the tool chucked in a tool spindle. Subsequently, the machine tool is operated using the tool-specific regulator parameters. In this way, a rapid and exact feed of coolant lubricant to the machining point of the respective chucked tool is enabled in a simple and flexible manner.

17 Claims, 7 Drawing Sheets

(52) U.S. Cl.
CPC ........ *B23Q 11/127* (2013.01); *F16N 2250/06* (2013.01); *G05B 19/0405* (2013.01); *G05B 2219/49043* (2013.01)

(56) References Cited

U.S. PATENT DOCUMENTS

2017/0066096 A1* 3/2017 Boelkins ............ B23Q 11/1046
2017/0113315 A1* 4/2017 Bangma ............. B23Q 11/1046

FOREIGN PATENT DOCUMENTS

| DE | 20 2016 004 501 U1 | 8/2016 |
| EP | 0 714 053 A2 | 5/1996 |
| EP | 2 388 507 A1 | 11/2011 |

* cited by examiner

METHOD FOR OPERATING A MACHINE TOOL, AND MACHINE TOOL

CROSS REFERENCE TO RELATED APPLICATIONS

This application is a United States National Phase Application of International Application PCT/EP2018/064841 filed Jun. 6, 2018 and claims the benefit of priority under 35 U.S.C. § 119 of German Patent Application, Serial No. DE 10 2017 209 822.8, filed on Jun. 9, 2017, the entire contents of which are incorporated herein by reference.

FIELD OF THE INVENTION

The invention relates to a method for operating a machine tool and a machine tool.

BACKGROUND OF THE INVENTION

During the cutting machining of a workpiece by means of a machine tool, a coolant lubricant is typically fed to the machining point of the tool on the workpiece. The exact feed of the coolant lubricant is difficult, since it is dependent on the tool used. A method for supplying a machining point with a lubricant is known from DE 102 48 932 A1, in which lubricant flows are stored in a data memory, with which specific tool diameters of the tool are associated. Upon selection of a specific tool diameter, the associated lubricant flow is specified as a target value to a control loop.

SUMMARY OF THE INVENTION

The invention is based on the object of providing a method for operating a machine tool, which enables a rapid and exact feed of coolant lubricant to the machining points of changing tools in a simple and flexible manner.

This object is achieved by a method for operating a machine tool having the following steps: providing a machine tool, comprising at least one tool spindle, and a coolant lubricant device having a pump for supplying the at least one tool spindle with a coolant lubricant, chucking a tool in the at least one tool spindle, computing tool-specific regulator parameters for regulating the pump on the basis of a machine-specific flow resistance for the coolant lubricant and a tool-specific flow resistance for the coolant lubricant, and operating the machine tool using the tool-specific regulator parameters. It has been recognized according to the invention that the regulator parameters for the regulation of the pump and for the feed of the coolant lubricant have to be set in a tool-specific manner on the basis of a machine-specific flow resistance and a tool-specific flow resistance to enable a rapid and exact feed of the coolant lubricant to the machining point of the respective tool chucked in the at least one tool spindle. The machine-specific flow resistance is independent of the respective chucked tool and characterizes the flow resistance for the coolant lubricant as a result of the machine installation and/or the feed line installation of the machine tool. In contrast, the tool-specific flow resistance is dependent on the respective tool chucked in the at least one tool spindle and characterizes the flow resistance for the coolant lubricant on the basis of the respective tool or the respective tool chucked in the at least one tool spindle. By means of the machine-specific flow resistance and the tool-specific flow resistance, tool-specific regulator parameters for the regulation of the pump and for the feed of the coolant lubricant to the respective chucked tool are computed. A rapid and exact feed of coolant lubricant to the machining point of the respective chucked tool is possible by the subsequent operation of the machine tool using the tool-specific regulator parameters. The feed of the coolant lubricant to the machining point takes place rapidly and in particular with only a minor overshoot, so that the feed of the coolant lubricant also takes place exactly. Because the machine-specific flow resistance is exclusively dependent on the machine installation, it only has to be determined one time and is subsequently available for the computation of tool-specific regulator parameters for various tools. The tool-specific flow resistance also only has to be determined one time for the respective tool and is subsequently available upon a further use of the tool for computing the tool-specific regulator parameters. In this way, the computation of the tool-specific regulator parameters is simplified with progressive operation of the machine tool. The computation of the tool-specific regulator parameters can thus be carried out simply and flexibly for various tools.

A method, wherein the machine-specific flow resistance is ascertained by operating the machine tool without a chucked tool, ensures a simple ascertainment of the machine-specific flow resistance. Because the machine tool, in particular in a test, is operated without a tool chucked in the at least one tool spindle, the machine-specific flow resistance is ascertainable in a simple manner. An operation of the machine tool without a chucked tool is implementable, for example, in such a way that a tool holder without a tool or a tool holder with a tool, which has no influence on the measurement of the machine-specific flow resistance, however, is chucked. This tool has a sufficiently large flow cross section, for example, that it has no influence on the ascertainment of the machine-specific flow resistance. In the case of a multi-spindle or two-spindle embodiment of the machine tool, the machine-specific flow resistance is determined in each case for the operation of the machine tool using different tool spindle constellations, i.e., in dependence on the number of active tool spindles. If the machine tool has two tool spindles, for example, one machine-specific flow resistance is thus determined for the one-spindle mode and one machine-specific flow resistance is determined for the two-spindle mode.

A method, wherein the machine-specific flow resistance is ascertained, for example, from a measured pump speed of the pump, a known pump characteristic curve, and a measured coolant lubricant pressure, so that only a small number of measurement sensors is required, enables a simple ascertainment of the machine specific flow resistance. In multi-spindle machine tools, the machine-specific flow resistance is moreover ascertained in dependence on the number of active tool spindles. The pump characteristic curve indicates, for example, a dependence between the pump speed, the pump pressure, and a volume flow.

A method, wherein the machine-specific flow resistance is stored in a control device, enables a simple and flexible computation of the tool-specific regulator parameters. Because the machine-specific flow resistance is independent of the respective tool chucked in the at least one tool spindle, it can be stored after it is ascertained once and can be reused to compute tool-specific regulator parameters of various tools.

A method, wherein the tool-specific flow resistance is ascertained by operating the machine tool using the tool chucked in the at least one tool spindle, enables a simple and flexible ascertainment of the respective tool-specific flow resistance. By way of operation of the machine tool, in particular in a test, having the tool chucked in the at least one tool spindle, if the machine-specific flow resistance is known, it is possible to ascertain the tool-specific flow resistance in a simple manner. During an initial use of the respective tool, the tool-specific flow resistance is ascertained by the operation in a test before the workpiece machining. The workpiece can subsequently be machined without a tool change using the computed tool-specific regulator parameters, wherein a rapid and exact feed of coolant lubricant to the machining point is ensured because of the tool-specific regulator parameters.

A method, wherein the tool-specific flow resistance is ascertained from an overall flow resistance and the machine-specific flow resistance, enables the ascertainment of the respective tool-specific flow resistance in a simple manner. In a one-spindle machine tool, the overall flow resistance is the total of the machine-specific flow resistance and the tool-specific flow resistance. The overall flow resistance is ascertained on the basis of measured variables. For example, the overall flow resistance is ascertained from a measured pump speed, a known pump characteristic curve, and a measured coolant lubricant pressure. The respective tool-specific flow resistance results by way of the subsequent subtraction of the machine-specific flow resistance. In a two-spindle machine tool, the overall flow resistance results from a connection in series of the machine-specific flow resistance and the tool-specific flow resistances connected in parallel.

A method, wherein the tool-specific flow resistance is ascertained from a pump speed, a pump characteristic curve, a coolant lubricant pressure, and the machine-specific flow resistance, enables a simple ascertainment of the respective tool-specific flow resistance. The respective tool-specific flow resistance is ascertainable in a simple manner from the measured pump speed, the known pump characteristic curve, the measured coolant lubricant pressure, and the machine-specific flow resistance. Firstly, an overall flow resistance is ascertainable from the pump speed, the pump characteristic curve, and the coolant lubricant pressure. The respective tool-specific flow resistance can subsequently be ascertained from the overall flow resistance and the known machine-specific flow resistance.

A method, wherein the tool-specific flow resistance is stored in conjunction with an identification, in particular a tool identification and/or a tool type identification, in a control device, enables the computation of tool-specific regulator parameters in a simple and flexible manner. Because the respective tool-specific flow resistance is stored in conjunction with an identification, in particular a tool identification and/or a tool type identification, in the control device, the respective tool-specific flow resistance is available after an initial ascertainment for the computation of tool-specific regulator parameters if the identical tool and/or a tool of identical type is again used. A renewed ascertainment is thus not necessary due to the storage of the respective tool-specific flow resistance.

A method, wherein the machine-specific flow resistance and/or the tool-specific flow resistance is ascertained in dependence on a number of active tool spindles, enables the computation of tool-specific regulator parameters in multi-spindle machine tools in a simple and flexible manner. The machine-specific flow resistance is ascertained for any number of active tool spindles. In the case of a two-spindle machine tool, for example, a machine-specific flow resistance for one active tool spindle and a machine-specific flow resistance for two active tool spindles are ascertained. The respective tool-specific flow resistance is also ascertained in particular in dependence on the number of active tool spindles. The computation of the tool-specific regulator parameters is subsequently performed in dependence on the number of active tool spindles, i.e., the machine-specific flow resistance ascertained for the number of active tool spindles and the respective tool-specific flow resistance.

A method, wherein the tool-specific flow resistance is ascertained using basic regulator parameters for regulating the pump, enables a simple ascertainment of the respective tool-specific flow resistance. During the initial ascertainment of the respective tool-specific flow resistance, a computation of optimized regulator parameters and/or tool-specific regulator parameters is not possible. To ascertain the respective tool-specific flow resistance, therefore basic regulator parameters are used for controlling the pump, which ensure a stable regulation of the feed of coolant lubricant. The basic regulator parameters are computed in particular in dependence on the machine-specific flow resistance. The ascertainment of the machine-specific flow resistance can also be performed using basic regulator parameters which ensure a stable regulation of the feed of coolant lubricant. After the determination of the machine-specific flow resistance and the tool-specific flow resistance and after the computation of tool-specific regulator parameters, the subsequent operation is not performed using the basic regulator parameters, but rather using the tool-specific regulation parameters.

A method, wherein a coolant lubricant pressure is measured, enables a simple and exact feed of coolant lubricant. The coolant lubricant pressure is measurable and controllable in a simple manner. The coolant lubricant pressure is preferably measured by means of a pressure sensor before the at least one tool spindle, in particular before a distributor point for distributing the coolant lubricant onto the tool spindles. Preferably, only one single pressure measurement sensor is necessary for measuring the coolant lubricant pressure. The coolant lubricant pressure is regulated in particular by means of a pump speed of the pump. The coolant lubricant is fed by means of a pressure regulation to the respective tool or the machining point of the respective tool. The pressure regulation is implemented by means of the variable-speed pump.

A method, wherein the computation of tool-specific regulator parameters is repeated after a tool change, ensures a rapid and exact feed of coolant lubricant to the machining points of changing tools. Because the computation of tool-specific regulator parameters associated with the respective chucked tool is carried out after every tool change, it is ensured that the optimum tool-specific regulator parameters are computed and used reliably for the combination of machine tool, number of active tool spindles, and chucked tool. Moreover, during the computation of tool-specific regulator parameters in dependence on a workpiece to be machined, a desired target pressure can be predetermined and taken into consideration in the computation of the tool-specific regulator parameters.

A method, wherein during operation of the machine tool, a coolant lubricant pressure is regulated by means of the pump, enables a rapid and exact feed of coolant lubricant. The pump enables a pressure regulation of the coolant lubricant in a simple manner. The coolant lubricant pressure is variable easily and rapidly in the desired manner by means of a pump speed or a regulation of the pump speed. The pump speed is available as a measured variable and can also be used in particular for ascertaining the machine-specific flow resistance and the respective tool-specific flow resistance.

A method, wherein during operation of the machine tool, the pump is regulated and after reaching a target range, the pump is controlled, enables a rapid and exact feed of coolant lubricant. The operation of the machine tool is initially performed in such a way that the coolant lubricant pressure is regulated by means of the pump. If the coolant lubricant pressure reaches a specified target range, the pressure regulation of the pump is thus switched over to a pressure control. A negative influence of a coolant lubricant dynamic pressure, which occurs during workpiece machining, is avoided by the controlled operation of the pump after reaching the target range for the coolant lubricant pressure. The regulation is thus not impaired by the coolant lubricant dynamic pressure after reaching the target range.

The invention is furthermore based on the object of providing a machine tool which enables a rapid and exact feed of coolant lubricant to the machining points of changing tools in a simple and flexible manner.

This object is achieved by a machine tool comprising at least one tool spindle, a coolant lubricant device having a pump for supplying the at least one tool spindle with a coolant lubricant, and a control device, wherein the control device is designed in such a way that tool-specific regulator parameters for regulating the pump can be computed on the basis of a machine-specific flow resistance for the coolant lubricant and a tool-specific flow resistance for the coolant lubricant. The advantages of the machine tool according to the invention correspond to the above-described advantages of the method according to the invention. The control device can be refined in particular using the inventive method for operating a machine tool.

A manufacturing facility having multiple machine tools according to the invention and a central control device enables a rapid and exact feed of coolant lubricant to the machining points of changing tools in a simple and flexible manner if multiple machine tools are used. The tool-specific flow resistances ascertained by the individual machine tools are transmitted together with an identification, in particular a tool identification and/or a tool type identification, to the central control device and stored therein. A tool catalog is managed in the central control device in this manner. The individual machine tools can access this tool catalog, so that the tool-specific flow resistance only has to be ascertained one time in the manufacturing facility for each tool or for each tool type, respectively. For example, the local control devices of the machine tools can be synchronized at regular time intervals with the central control device.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
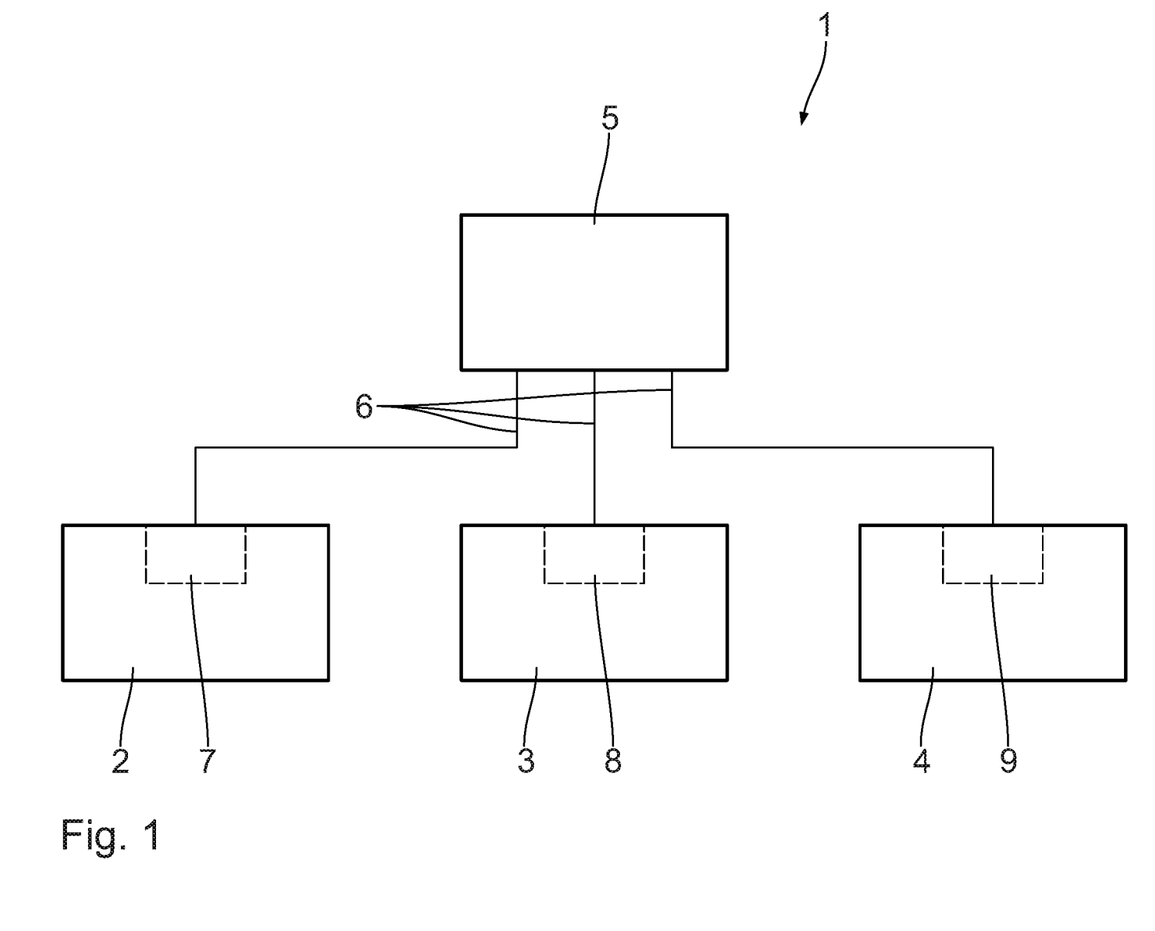
FIG. 1 is a schematic view of a manufacturing facility having multiple machine tools and a central control device.

A manufacturing facility 1 comprises multiple machine tools 2, 3, 4, which are connected to a central control device 5 via a data transmission network 6. The machine tools 2, 3, 4 each have a local control device 7, 8, 9. The local control devices 7, 8, 9 have a signal connection to the central control device 5 via the data transmission network 6. The manufacturing facility 1 is illustrated in FIG. 1.

Figure 2:
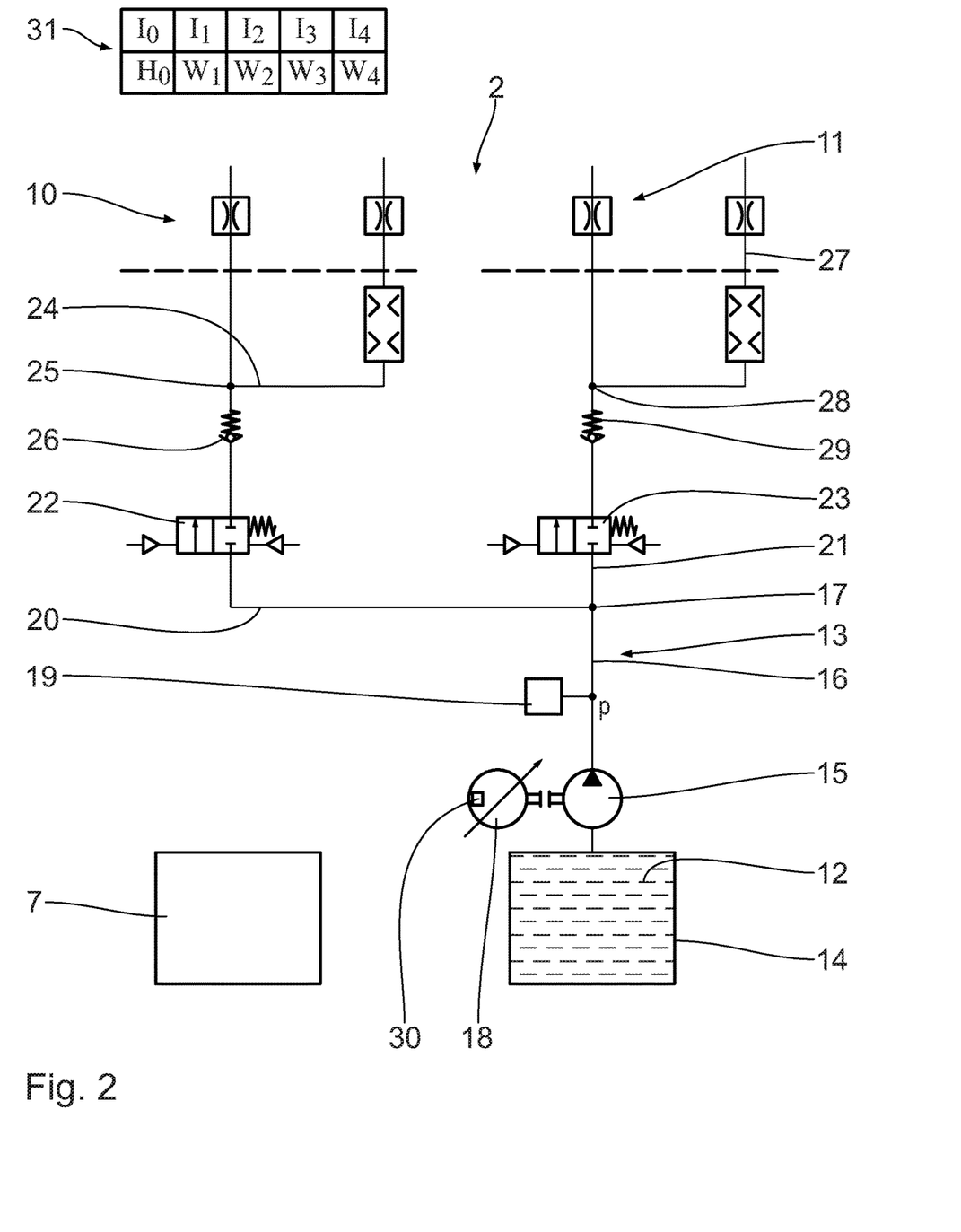
FIG. 2 is a schematic view of a coolant lubricant device of one of the machine tools shown in FIG. 1 for supplying two tool spindles with a coolant lubricant.

The machine tool 2 comprises two tool spindles 10, 11, which are connected to a coolant lubricant device 13 for the supply with a coolant lubricant 12. The coolant lubricant device 13 comprises a container 14 for accommodating the coolant lubricant 12 and a pump 15 for conveying the coolant lubricant 12 from the container 14 via a feed line 16 to a distributor point 17. The pump 15 is speed-controllable by means of an electric drive motor 18. A coolant lubricant pressure p in the feed line 16 is measurable by means of a pressure measurement sensor 19.

At the distributor point 17, the feed line 16 divides into a feed line 20, which leads to the first tool spindle 10, and a feed line 21, which leads to the second tool spindle 11. A first valve 22 is arranged in the feed line 20 for switching on the coolant lubricant 12. Accordingly, a second valve 23 is arranged in the feed line 21. In parallel to the first tool spindle 10, the coolant lubricant device 13 forms a first bypass 24, which branches off after the first valve 22 from the feed line 20 at a first branching point 25. A first check valve 26 is arranged between the first branching point 25 and the first valve 22 to prevent the line section between the first valve 22 and the first check valve 26 from running empty via the first tool spindle 10 or the first bypass 24. In a corresponding manner, a second bypass 27 is arranged in parallel to the first tool spindle 11 proceeding from a second branching point 28. Moreover, a second check valve 29 is arranged in a corresponding manner between the second branching point 28 and the second valve 23.

The measured coolant lubricant pressure p is provided via a signal line to the control device 7. The drive motor 18 comprises, for example, a speed measurement sensor 30 for measuring a pump speed n, which is provided via a signal line to the control device 7. However, the pump speed n can also be ascertained without a sensor via an inverter and provided to the control device 7. In addition, the control device 7 has a signal connection to the drive motor 18, the valves 22, 23, the tool spindles 10, 11, and the bypasses 24, 27.

The machine tool 2 is additionally constructed in a routine manner. To provide various tools $W_1$ to $W_4$, the machine tool 2 has a tool magazine 31, in which the tools $W_1$ to $W_4$ are kept ready with an associated identification $I_1$ to $I_4$. The tools $W_1$ to $W_4$ are fastened, for example, in associated tool holders, by means of which the tools $W_1$ to $W_4$ can be chucked in tool receptacles of the tool spindles 10, 11 in a typical manner. In addition, empty tool holders $H_0$ having the identification $I_0$ are kept ready in the tool magazine 31. The tool holders $H_0$ have, for example, a minimum diameter of 30 mm.

The machine tools 3, 4 are structurally equivalent to and/or different from the machine tool 2. The machine tools 3, 4 comprise coolant lubricant devices corresponding to the coolant lubricant device 13. The coolant lubricant devices are used, depending on the construction of the machine tools 3, 4, to supply one tool spindle and/or to supply two tool spindles.

Figure 3:
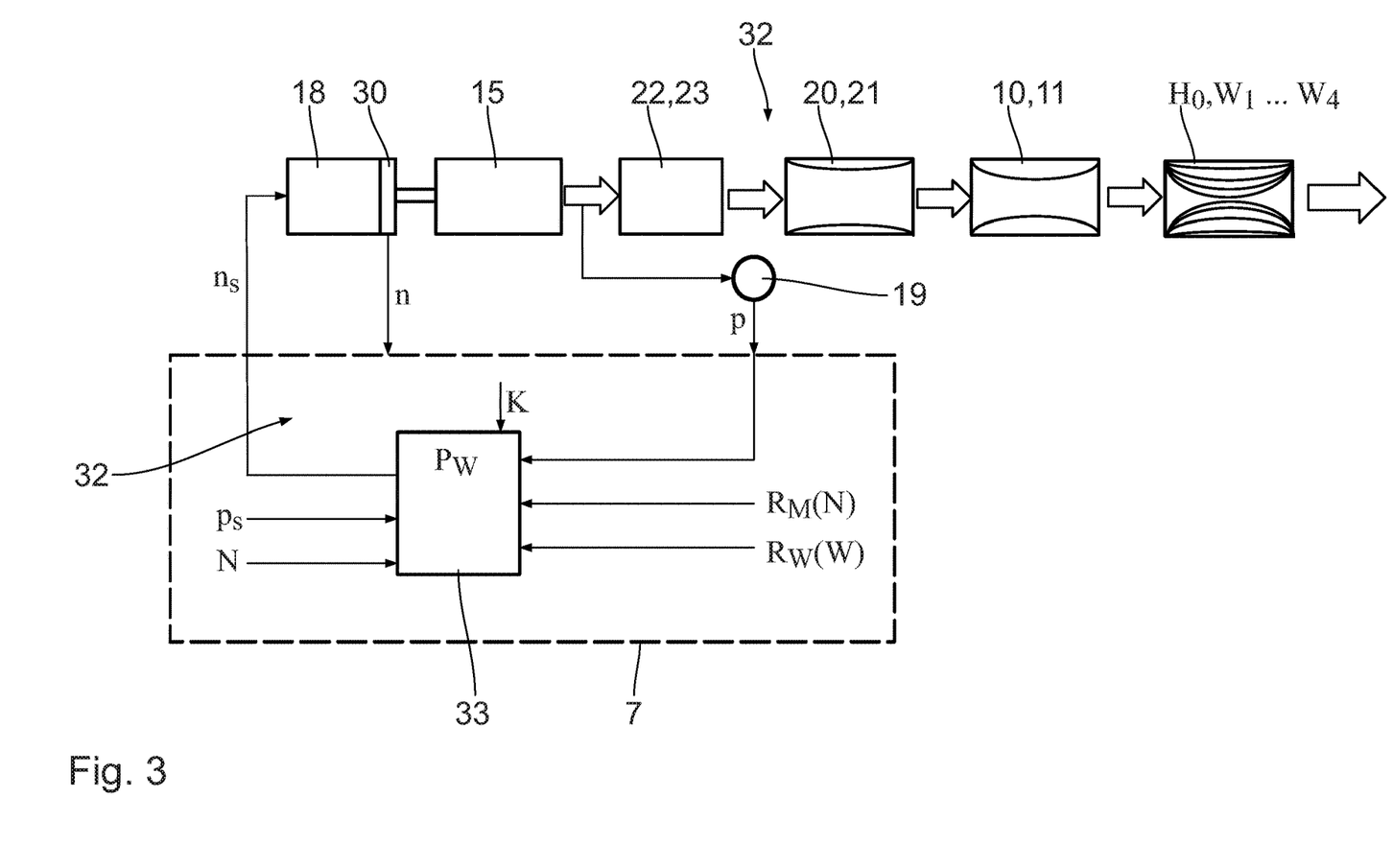
FIG. 3 is a schematic view of an adaptive pressure regulation for supplying the tool spindles in FIG. 2 with the coolant lubricant.

An adaptive pressure regulation 32 of the machine tool 2 is described hereafter. An adaptive pressure regulator 33 is implemented in the control device 7, which has as input variables a target pressure $p_S$, the measured coolant lubricant pressure p, a number N of the active tool spindles 10, 11, a machine-specific flow resistance $R_M(N)$, and a tool-specific flow resistance $R_W(W)$. The machine-specific flow resistance $R_M(N)$ and the tool-specific flow resistance $R_W(W)$ are initially unknown. In addition, the pressure regulator 33 has as an input variable a pump characteristic curve K, which is known. The pump characteristic curve K is provided, for example, by a pump producer.

Figure 4:
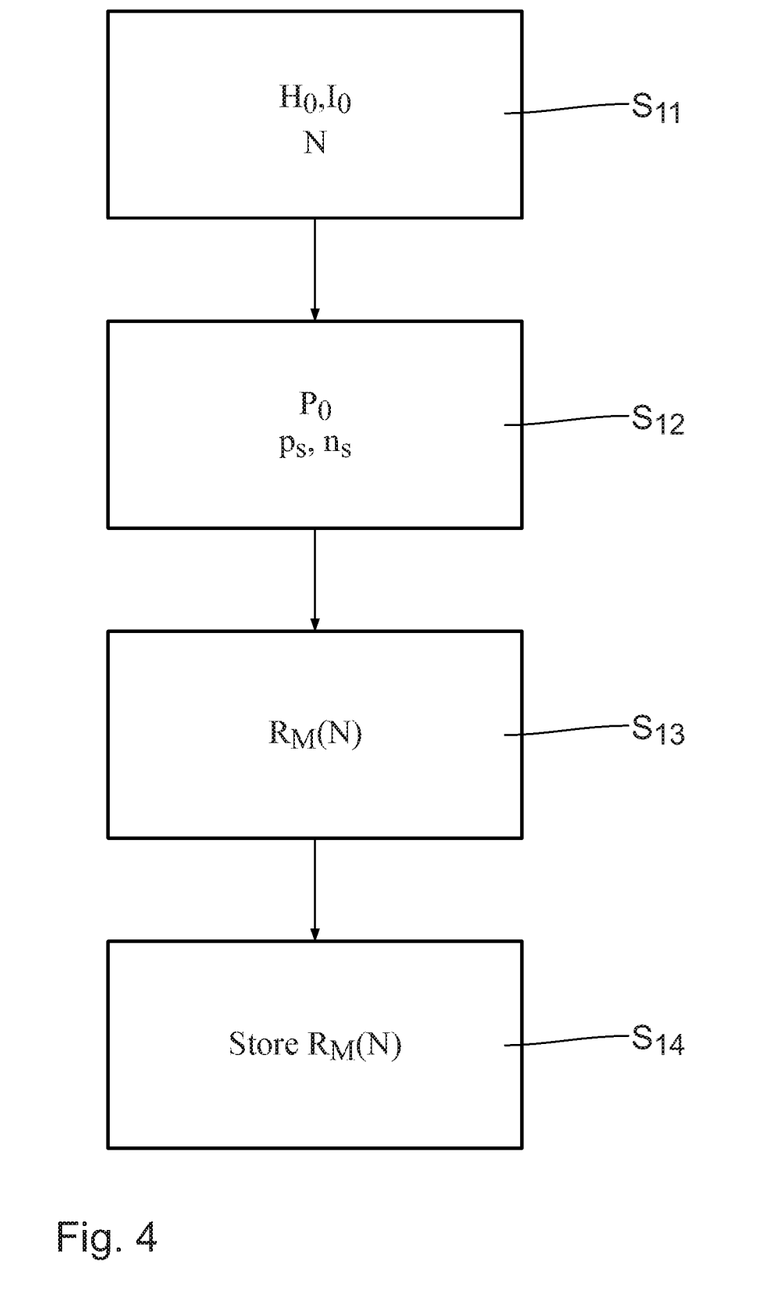
FIG. 4 is a view of a flow chart for ascertaining a machine-specific flow resistance for the design of the pressure regulation in FIG. 3.

For the parameterization of the adaptive pressure regulation 32, firstly the machine-specific flow resistance $R_M(N)$ is ascertained. This is illustrated in FIG. 4. For this purpose, a program sequence for ascertaining the machine-specific flow resistance $R_M(N)$ is selected by means of the control device 7. In a first step $S_{11}$, the empty tool holders $H_0$ are chucked in the tool spindles 10, 11 from the tool magazine 31. For the number of active tool spindles 10, 11, initially N=1 applies, which means that, for example, only the tool spindle 10 or only the tool spindle 11 is active. For this purpose, one of the valves 22, 23 is open and the corresponding other valve 22, 23 is closed.

Subsequently, the pressure regulator 33 is parameterized in step $S_{12}$ using basic regulator parameters $P_0$, which ensure a stable pressure regulation. A target pressure $p_S$ is predetermined for the pressure regulator 33, which is converted by the pressure regulator 33 into a target speed $n_S$ for the pump 15 or the drive motor 18, respectively. In subsequent operation of the machine tool 2, the speed n and the coolant lubricant pressure p are measured and acquired in the control device 7. The drive motor 18 comprises a subordinate speed control loop (not shown in greater detail in FIG. 3) for regulating the target pressure $p_S$. During the ascertainment of the machine-specific flow resistance $R_M$, the pump 15 is operated, for example, at maximum speed.

In a subsequent step $S_{13}$, the control device 7 computes the machine-specific flow resistance $R_M(N)$ for the number N=1 from the measured coolant lubricant pressure p, the measured pump speed n, and the pump characteristic curve K. The pump characteristic curve K characterizes, for example, a volume flow and/or a generated pump pressure in dependence on the pump speed n.

The ascertained machine-specific flow resistance $R_M(N)$ is subsequently stored in a step $S_{14}$ in the machine data of the control device 7 and is available in further operation of the machine tool 2.

Steps $S_{11}$ to $S_{14}$ are subsequently repeated—if necessary—having the open valves 22, 23 for the number N=2. Therefore, the machine-specific flow resistance $R_M(N)$ is ascertained for two active tool spindles 10, 11 and stored in the control device 7.

The machine-specific flow resistance $R_M(N)$ exclusively characterizes the flow resistance of the machine installation in dependence on the number N of the active tool spindles 10, 11. The machine-specific flow resistance $R_M(N)$ is independent of a tool chucked in the respective tool spindle 10, 11.

Figure 5:
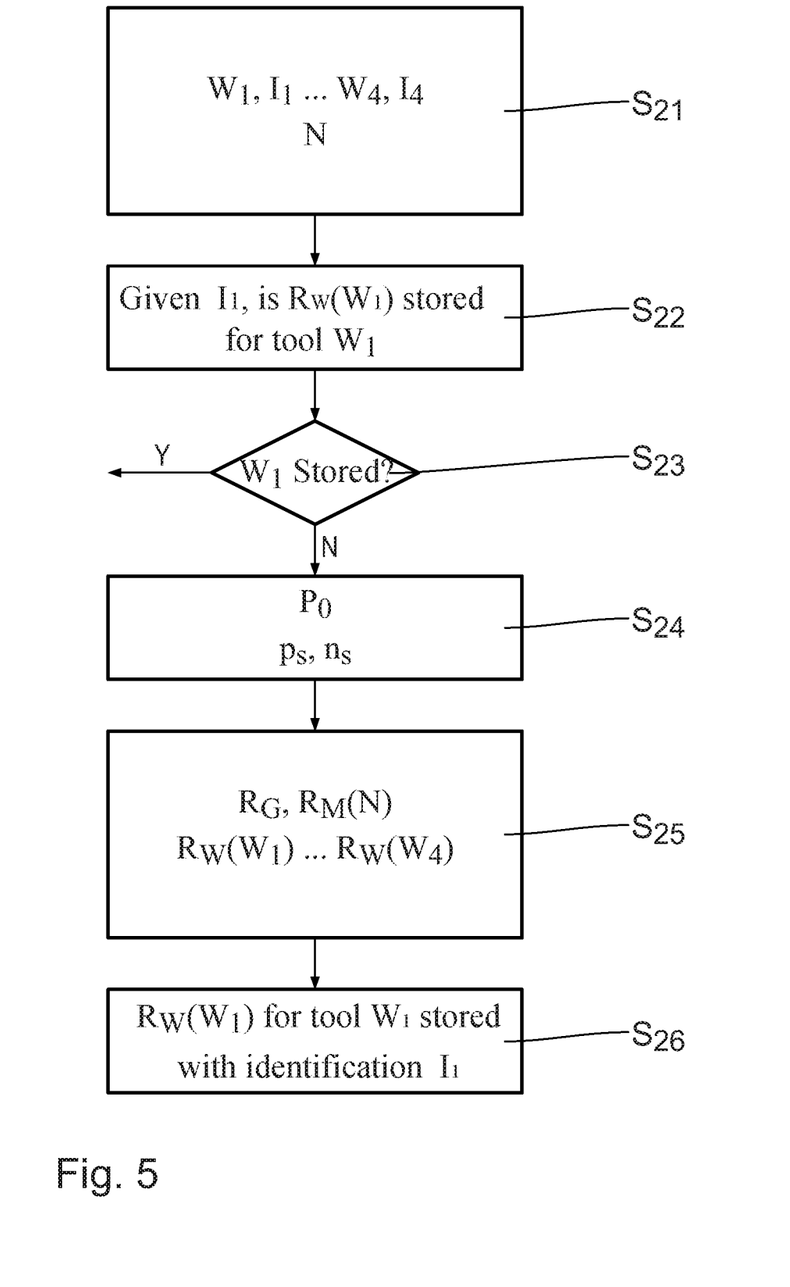
FIG. 5 is a view of a flow chart for ascertaining a tool-specific resistance of the respective tool for the design of the pressure regulation in FIG. 3.

The ascertainment of the tool-specific flow resistance $R_R(W_1)$ is described hereafter on the basis of FIG. 5. For this purpose, a program implemented in the control device 7 is started, which carries out a tool change in a step $S_{21}$, so that the tool $W_1$ having the identification $I_1$ is chucked in the first tool spindle 10. The tool-specific flow resistance $R_R(W_1)$ is ascertained automatically during the processing sequence if a tool-specific flow resistance $R_W(W_1)$ is not stored for the tool $W_1$. A special measurement program is not required or started. The first valve 22 is opened, while in contrast the second valve 23 is closed, so that the machine tool 2 is operated using the active tool spindle 10. Alternatively or additionally, a tool $W_1$ can be chucked in the second tool spindle 11 and the machine tool 2 can be operated using one active tool spindle 11 or using two active tool spindles 10, 11. The number N is predetermined for the control device 7.

Subsequently, in a step $S_{22}$, it is checked on the basis of the identification $I_1$ in the control device 7 whether a tool-specific flow resistance $R_W(W_1)$ is already stored for the tool $W_1$. If a tool-specific flow resistance $R_W(W_1)$ is already stored, it is read out in a step $S_{23}$ and used for the following computations.

If a tool-specific flow resistance $R_W(W_1)$ is not stored, thus, in a following step $S_{24}$, the pressure regulator 33 is parameterized using basic regulator parameters $P_0$. A target pressure $p_S$ and the number N of active tool spindles 10, 11 is specified to the pressure regulator 33. During the subsequent operation in a test of the machine tool 2, the coolant lubricant pressure p is measured and the target pressure $p_S$ is adjusted by means of the pressure regulator 33. For this purpose the pressure regulator 33 specifies the pump speed $n_S$, which is regulated by means of the electric drive motor 18. The pump speed n is measured and fed to a subordinate speed control loop.

In a following step $S_{25}$, the tool-specific flow resistance $R_W(W_1)$ is computed for the tool $W_1$. For this purpose, firstly an overall flow resistance $R_G$ is computed from the measured coolant lubricant pressure p, the measured pump speed n, and the pump characteristic curve K. Subsequently, the tool-specific flow resistance $R_W(W_1)$ is computed from the computed overall flow resistance $R_G$, by the machine-specific flow resistance $R_M(N)$ being subtracted from the overall flow resistance $R_G$. Depending on the number N of active tool spindles 10, 11, the ascertained machine-specific flow resistance $R_M(N)$ for one active tool spindle or the ascertained machine-specific flow resistance $R_M(N)$ for two active tool spindles 10, 11 is subtracted from the overall flow resistance $R_G$.

Subsequently, in a step $S_{26}$, the computed tool-specific flow resistance $R_W(W_1)$ for the tool $W_1$ is stored together with the identification $I_1$ in the tool data of the control device 7.

Steps $S_{21}$ to $S_{26}$ are repeated for the further tools $W_2$ to $W_4$ and the associated identifications $I_2$ to $I_4$. Alternatively, after the ascertainment of the tool-specific flow resistance $R_W(W_1)$, it is possible to begin with the machining of a workpiece by means of the tool $W_1$ and to wait for the ascertainment of the respective tool-specific flow resistance $R_W(W_2)$ to $R_W(W_4)$ until a machining is provided using the respective tool $W_2$ to $W_4$.

The identifications $I_1$ to $I_4$ are, for example, a tool identification of the special tool $W_1$ to $W_4$ and/or a tool type identification of tools $W_1$ to $W_4$, which are associated with the same tool type and therefore have corresponding tool-specific flow resistances $R_W(W)$.

Figure 6:
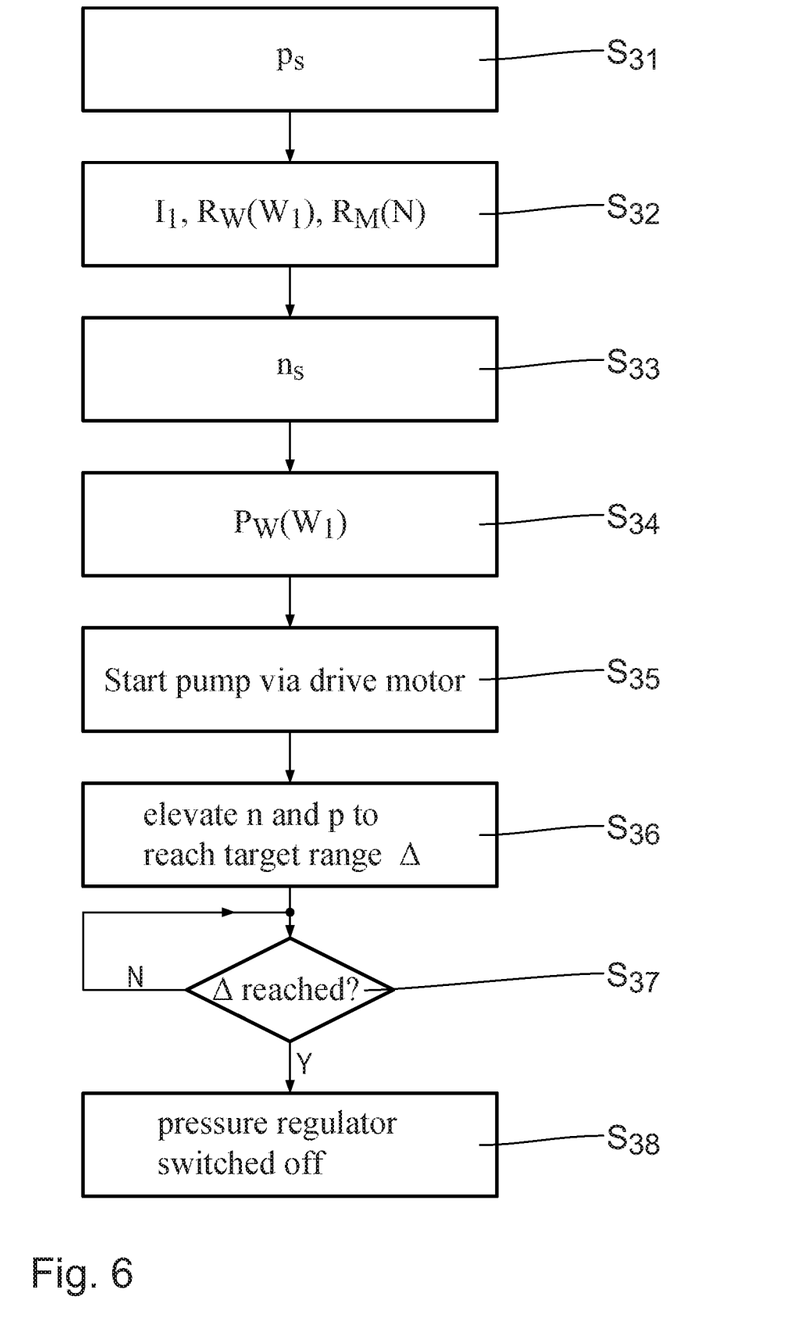
FIG. 6 is a view of a flow chart for computing tool-specific regulator parameters for the pressure regulation in FIG. 3.

After the ascertainment of the machine-specific flow resistance $R_M(N)$ and the tool-specific flow resistance $R_W(W_1)$, the machine tool 2 is operated using the tool $W_1$ and an adaptive pressure regulation 32. This is illustrated in FIG. 6. Firstly, in a step $S_{31}$, the machining program or the NC program is loaded into the control device 7 for this purpose. The machining program contains switching on and off points in time of the coolant lubricant device 13 and the target pressure $p_S$.

On the basis of the identification $I_1$, the stored tool-specific flow resistance $R_W(W_1)$ of the tool $W_1$ is read out from the control device 7 in a step $S_{32}$.

In a subsequent step $S_{33}$, the target speed $n_S$ of the pump 15 is computed from the target pressure $p_S$ and the pump characteristic curve K, which is specified to the subordinate speed control loop as a pilot control value or starting speed. The starting speed is computed in dependence on the number N, the associated machine-specific flow resistance $R_M(N)$, the tool-specific flow resistance $R_W(W_1)$ of the tool $W_1$, and the target pressure $p_S$.

In a subsequent step $S_{34}$, tool-specific regulator parameters $P_W$ are computed, using which the pressure regulator 33 is parameterized. The pressure regulator 33 is, for example, a PI regulator or PID regulator. The regulator parameters $P_W$ are dependent on the selected machine installation or the number N of active tool spindles 10, 11 and the respective utilized tool $W_1$ to $W_4$. Accordingly, the pressure regulator 33 is parameterized specifically to the machine and tool, so that the pressure regulation 32 is adaptive.

The tool-specific regulator parameters $P_W$ can be stored for the respective selected special machine and tool constellation, so that they are available for a subsequent operation of the machine tool 2 using the same machine and tool constellation. Alternatively, steps $S_{31}$ to $S_{34}$ can be repeated after each tool change and/or after each change of the number N of active tool spindles 10, 11, so that a storage is not required.

In a subsequent step $S_{35}$, the pump 15 is started by means of the drive motor 18. The target speed $n_S$ is specified in the form of a jump function as a pilot control value. The machine tool 2 is operated using the tool-specific regulator parameters $P_W$ and the tool $W_1$.

Subsequently, in a step $S_{36}$, the pump speed n and the coolant lubricant pressure p are elevated by means of the adaptive pressure regulation 32 until, for example, the pump speed n and/or the coolant lubricant pressure p reach(es) a target range $\Delta$. The specified target pressure $p_S$ is regulated by means of the adaptive pressure regulator 33 and a subordinate speed control loop.

In a step $S_{37}$, it is regularly queried whether the target range $\Delta$ is reached. If the target range $\Delta$ is not yet reached, the pressure regulation 32 is thus still active. In contrast, if the target range $\Delta$ is reached, the pressure regulation 32 is thus switched off in a step $S_{38}$ and the achieved speed n of the pump 15 is frozen. The pump 15 is thus operated further in a controlled manner.

Figure 7:
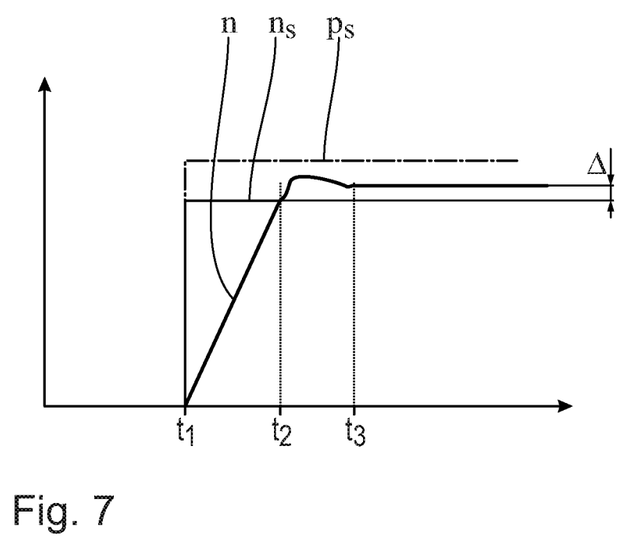
FIG. 7 is a view of a time diagram for the pressure regulation in FIG. 3.

The function of the adaptive pressure regulation 32 is illustrated in FIG. 7. At the point in time $t_1$, the target pressure $p_S$ and the target speed $n_S$ are specified as a jump function. The target speed $n_S$ is specified as a pilot control value or computed starting speed. Subsequently, the drive motor 18 and/or the pump 15 accelerates at maximum torque to the target speed $n_S$. At the point in time $t_2$, the measured pump speed n reaches the target speed $n_S$. The pressure regulator 33 corrects the pump speed n until it is in the target range $\Delta$. This is the case at the point in time $t_3$. The pump speed n is subsequently frozen. The pump 15 is thus merely still controlled. In this way, negative influences on the pressure regulation 32 as a result of dynamic pressure during the workpiece machining are avoided.

The tool-specific flow resistances $R_W$ ascertained by the machine tools 2, 3, 4 are transmitted at regular time intervals to the central control device 5 and stored therein as a tool catalog. The tool-specific flow resistances $R_W$ stored in the central control device 5 are in turn transmitted to the local control devices 7, 8, 9, so that the local control devices 7, 8, 9 synchronize with one another. In this manner, each tool-specific flow resistance $R_W$ only has to be ascertained once in the manufacturing facility 1.

The adaptive coolant lubricant pressure regulation 32 enables, in a simple and flexible manner, a rapid and exact feed of coolant lubricant 12 to the machining points of changing tools $W_1$ to $W_4$. The control loops having the drive motor 18, the pump 15, the machine installation, and the tool spindle 10 and/or 11 and also a respective tool $W_1$ to $W_4$ chucked therein are automatically measured. Basic regulator parameters $P_0$ are used for this purpose. Associated tool-specific flow resistances $R_W$ can be computed from the resulting coolant lubricant pressures p and pump speeds n for the respective tool $W_1$ to $W_4$ and tool-specific regulator parameters $P_W$ for the respective tool $W_1$ to $W_4$ can be computed together with a machine-specific flow resistance $R_M$. The tool-specific flow resistances $R_W$ for the respective tool $W_1$ to $W_4$ are stored in the region of the tool data of the local control device 7, 8, 9 of the respective machine tool 2, 3, 4. The adaptive pressure regulation 32 enables a rapid and stable provision of the coolant lubricant 12 in this way. The regulator result is substantially independent in this case of the utilized tool $W_1$ to $W_4$. The machine-specific flow resistance $R_M$ is ascertained in dependence on the number N of active tool spindles 10, 11, so that the tool-specific regulator parameters $P_W$ are computed in dependence on a one-spindle or two-spindle machining, respectively. The adaptive pressure regulation 32 thus adjusts itself to the fluid-dynamic properties of the respective machine tool 2, 3, 4 and the respective utilized tool $W_1$ to $W_4$. The measurement of the flow resistances $R_M$ and $R_W$ takes place automatically. In this way, shorter startup times can be implemented. Tools used for the first time can be integrated without problems into the manufacturing facility 1. A rapid provision of the coolant lubricant 12 without or without a noticeable overshoot in the pressure regulation is enabled by the adaptive pressure regulation 32. This protects the drive motor 18 and/or the pump 15. The flow resistances $R_M$ and/or $R_W$ are computed via the delivery quantity of the pump 15, i.e., the pump speed n and the pump characteristic curve K and the pressure loss up to the pressure measurement sensor 19. Basic regulator parameters $P_0$ for ascertaining the respective tool-specific flow resistance $R_W$ can be computed from the ascertained specific flow resistance $R_M$.

While specific embodiments of the invention have been shown and described in detail to illustrate the application of the principles of the invention, it will be understood that the invention may be embodied otherwise without departing from such principles.

The invention claimed is:

1. A method for operating a machine tool, the method comprising the following steps:

providing a machine tool comprising at least one tool spindle and a coolant lubricant device having a pump for supplying the at least one tool spindle with a coolant lubricant;

chucking a tool in the at least one tool spindle;

computing tool-specific regulator parameters for regulating the pump based on a machine-specific flow resistance for the coolant lubricant and a tool-specific flow resistance for the coolant lubricant; and operating the machine tool using the tool-specific regulator parameters, wherein the machine-specific flow resistance is ascertained by operating the machine tool without the tool.

2. The method as claimed in claim 1, wherein the machine-specific flow resistance is ascertained from a pump speed, a pump characteristic curve, and a coolant lubricant pressure.

3. The method as claimed in claim 1, wherein the machine-specific flow resistance is stored in a control device.

4. The method as claimed in claim 1, wherein the tool-specific flow resistance is ascertained by operating the machine tool using the tool chucked in the at least one tool spindle.

5. The method as claimed in claim 1, wherein the tool-specific flow resistance is ascertained from an overall flow resistance and the machine-specific flow resistance.

6. The method as claimed in claim 1, wherein the tool-specific flow resistance is ascertained from a pump speed, a pump characteristic curve, a coolant lubricant pressure, and the machine-specific flow resistance.

7. The method as claimed in claim 1, wherein the tool-specific flow resistance is stored in conjunction with an identification in a control device.

8. The method as claimed in claim 7, wherein the tool-specific flow resistance is stored in conjunction with at least one of a tool identification and a tool type identification in the control device.

9. The method as claimed in claim 1, wherein at least one of the machine-specific flow resistance and the tool-specific flow resistance is ascertained in dependence on a number of active tool spindles.

10. The method as claimed in claim 1, wherein the tool-specific flow resistance is ascertained using basic regulator parameters for regulating the pump.

11. The method as claimed in claim 1, wherein a coolant lubricant pressure is measured.

12. The method as claimed in claim 1, wherein computation of tool-specific regulator parameters is repeated after a tool change.

13. The method as claimed in claim 1, wherein during operation of the machine tool, a coolant lubricant pressure is regulated by the pump.

14. The method as claimed in claim 1, wherein during operation of the machine tool, the pump is regulated and after reaching a target range, the pump is controlled.

15. A machine tool, comprising:
at least one tool spindle;
a coolant lubricant device having a pump for supplying the at least one tool spindle with a coolant lubricant; and
a control device configured such that tool-specific regulator parameters for regulating the pump are computed based on a machine-specific flow resistance for the coolant lubricant and a tool-specific flow resistance for the coolant lubricant, wherein the machine-specific flow resistance is ascertained by operating the machine tool without the tool, the machine-specific flow resistance is stored in the control device, the tool-specific flow resistance is ascertained by operating the machine tool using the tool chucked in the at least one tool spindle, and the tool-specific flow resistance is stored in conjunction with an identification in a control device.

16. A manufacturing facility comprising:
multiple machine tools and a central control device, each of the machine tools comprising at least one tool spindle, a coolant lubricant device and a control device, the coolant lubricant device having a pump for supplying the at least one tool spindle with a coolant lubricant, the control device being configured such that tool-specific regulator parameters for regulating the pump are computed based on a machine-specific flow resistance for the coolant lubricant and a tool-specific flow resistant for the coolant lubricant, wherein the machine-specific flow resistance is ascertained by operating the machine tool without the tool and the machine-specific flow resistance is stored in the control device, the tool-specific flow resistance is ascertained by operating the machine tool using the tool chucked in the at least one tool spindle, and the tool-specific flow resistance is stored in conjunction with an identification in a control device.

17. A method for operating a machine tool, the method comprising the following steps:
providing a machine tool comprising at least one tool spindle and a coolant lubricant device having a pump for supplying the at least one tool spindle with a coolant lubricant;

chucking a tool in the at least one tool spindle;

computing tool-specific regulator parameters for regulating the pump based on a machine-specific flow resistance for the coolant lubricant and a tool-specific flow resistance for the coolant lubricant; and operating the machine tool using the tool-specific regulator parameters, wherein the tool-specific flow resistance is ascertained by operating the machine tool using the tool chucked in the at least one tool spindle.

* * * * *